US011886711B2

(12) United States Patent
Mallick et al.

(10) Patent No.: US 11,886,711 B2
(45) Date of Patent: Jan. 30, 2024

(54) HOST-ASSISTED IO SERVICE LEVELS UTILIZING FALSE-POSITIVE SIGNALING

(71) Applicant: Dell Products L.P., Round Rock, TX (US)

(72) Inventors: Sanjib Mallick, Bangalore (IN); Vinay G. Rao, Bangalore (IN); Jaeyoo Jung, Shrewsbury, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 17/841,933

(22) Filed: Jun. 16, 2022

(65) Prior Publication Data
US 2023/0409199 A1      Dec. 21, 2023

(51) Int. Cl.
*G06F 3/06* (2006.01)
*G06F 11/34* (2006.01)

(52) U.S. Cl.
CPC ............ *G06F 3/0611* (2013.01); *G06F 3/067* (2013.01); *G06F 3/0659* (2013.01); *G06F 11/3409* (2013.01)

(58) Field of Classification Search
CPC ...... G06F 3/0611; G06F 3/0659; G06F 3/067; G06F 11/3409
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |

(Continued)

FOREIGN PATENT DOCUMENTS

| CN | 103677927 B | 2/2017 |
| EP | 1117028 A2 | 7/2001 |
| EP | 2667569 A1 | 11/2013 |

OTHER PUBLICATIONS

Wen et al., JoiNS: Meeting Latency SLO with Integrated Control for Networked Storage, 2018, IEEE, pp. 194-200 (Year: 2018).*

(Continued)

*Primary Examiner* — Gary W. Cygiel
(74) *Attorney, Agent, or Firm* — Ryan, Mason & Lewis, LLP

(57) ABSTRACT

An apparatus comprises at least one processing device. The at least one processing device is configured to identify at least one logical storage device that has a first service level objective and is exhibiting a deficiency in one or more performance metrics, to identify one or more additional logical storage devices each having a second service level objective lower than the first service level objective and not exhibiting a deficiency in the one or more performance metrics, to generate at least one false-positive signal specifying the one or more additional logical storage devices as each exhibiting a deficiency in the one or more performance metrics, and to provide the at least one false-positive signal to at least one host device. The at least one host device is configured to respond to the at least one false-positive signal by throttling input-output operations for the one or more additional logical storage devices.

20 Claims, 4 Drawing Sheets

(56) References Cited

U.S. PATENT DOCUMENTS

| | | |
|---|---|---|
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,050,825 B1* | 6/2021 | Marappan ............... G06F 3/067 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1* | 10/2019 | Mallick .................. H04L 41/50 |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |

OTHER PUBLICATIONS

International Search Report and Written Opinion of PCT/US2019/052549 dated Dec. 4, 2019, 13 pages.

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

NVM Express, "NVM Express Base Specification, Revision 2.0a," NVM Express, Jul. 23, 2021, 454 pages.

NVM Express, "NVM Express Base Specification, Revision 2.0b," NVM Express, Jan. 6, 2022, 455 pages.

U.S. Appl. No. 17/326,452 filed in the name of Sanjib Mallick et al. on May 21, 2021, and entitled "Write Pressure Throttling Based on Service Level Objectives."

* cited by examiner

HOST-ASSISTED IO SERVICE LEVELS UTILIZING FALSE-POSITIVE SIGNALING

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In many situations, the IO operations include bursts of operations that are generated by one or more host devices and sent to the storage system, potentially overwhelming the limited IO queues and other resources that the storage system can allocate for the use of the individual host devices. Excessive queuing of IO operations in a storage array can not only lead to potentially misleading response time measurements for those IO operations, but can also cause the storage system to frequently signal queue-full conditions back to the host devices, which can adversely impact the performance of the host devices.

SUMMARY

Illustrative embodiments provide techniques for host-assisted IO service levels utilizing false-positive signaling, in conjunction with the processing of IO operations directed by one or more host devices to a storage array or other storage system. The IO service levels illustratively comprise respective service level objectives (SLOs) implemented for respective logical storage volumes or other logical storage devices by the storage system. In some embodiments, the one or more host devices are configured to facilitate the achievement of the SLOs in the storage system by adjusting the manner in which the one or more host devices queue IO operations for particular logical storage devices prior to sending those IO operations to the storage system, responsive to information received from the storage system. Such information is provided by the storage system to the one or more host devices in some embodiments, for example, by signaling false-positive events in accordance with a predictable latency mode of a storage access protocol, illustratively an NVMe access protocol.

In some embodiments, at least a portion of the host-assisted IO service levels functionality is implemented in at least one host driver, such as a multi-path input-output (MPIO) driver of a host device. Other types of host drivers can be used in place of or in addition to one or more MPIO drivers.

Illustrative embodiments disclosed herein provide significant advantages over conventional practice. For example, these embodiments advantageously facilitate the achievement of SLOs while avoiding excessive queuing of IO operations in a storage array. Such embodiments can provide more accurate response time measurements for those IO operations, while also preventing excessive signaling of queue-full conditions back to the host devices, thereby improving the performance of the host devices.

In one embodiment, an apparatus comprises at least one processing device that includes a processor and a memory, with the processor being coupled to the memory. The at least one processing device is configured to identify at least one logical storage device that has a first SLO and is exhibiting a deficiency in one or more performance metrics, and to identify one or more additional logical storage devices each having a second SLO lower than the first SLO and not exhibiting a deficiency in the one or more performance metrics.

The at least one processing device is further configured to generate at least one false-positive signal specifying the one or more additional logical storage devices as each exhibiting a deficiency in the one or more performance metrics, and to provide the at least one false-positive signal to at least one host device. The at least one host device is configured to respond to the at least one false-positive signal by throttling IO operations for the one or more additional logical storage devices.

The at least one processing device in some embodiments is illustratively implemented in a storage array or other type of storage system that is configured to communicate with the at least one host device over at least one network, although other arrangements are possible in other embodiments.

In some embodiments, the first SLO illustratively comprises a highest one of a plurality of SLOs supported by the storage system, and the second SLO illustratively comprises a lowest one of a plurality of SLOs supported by the storage system.

The one or more performance metrics comprise at least a response time metric for IO operations directed to at least one of the logical storage devices by the at least one host device, although additional or alternative performance metrics can be used.

In some embodiments, the storage system communicates with the at least one host device over the at least one network utilizing a designated storage access protocol that supports a predictable latency mode.

The at least one false-positive signal is illustratively generated in such embodiments in accordance with a signaling mechanism of the predictable latency mode of the designated storage access protocol.

For example, the at least one false-positive signal illustratively comprises at least one predictable latency warning event of the predictable latency mode.

Such a predictable latency warning may more particularly comprise, for example, at least one of a deterministic window reads warning event and a deterministic window writes warning event of the predictable latency mode.

In some embodiments, the at least one false-positive signal is generated even though values of the one or more performance metrics for respective ones of the one or more additional logical storage devices each fail to satisfy at least one specified threshold for generation of a predictable latency warning event in the predictable latency mode.

The at least one host device in some embodiments is configured to respond to the at least one false-positive signal by increasing a queuing time in one or more queues of the at least one host device for each of one or more IO operations directed to the one or more additional logical storage devices.

In some embodiments, the at least one false-positive signal is provided to the at least one host device in at least one log page accessible to the at least one host device.

The at least one false-positive signal illustratively serves to mark each of the one or more additional logical storage devices for de-prioritization by the at least one host device.

In some embodiments, the at least one false-positive signal is generated for only reads of the one or more additional logical storage devices or for only writes of the one or more additional logical storage devices.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
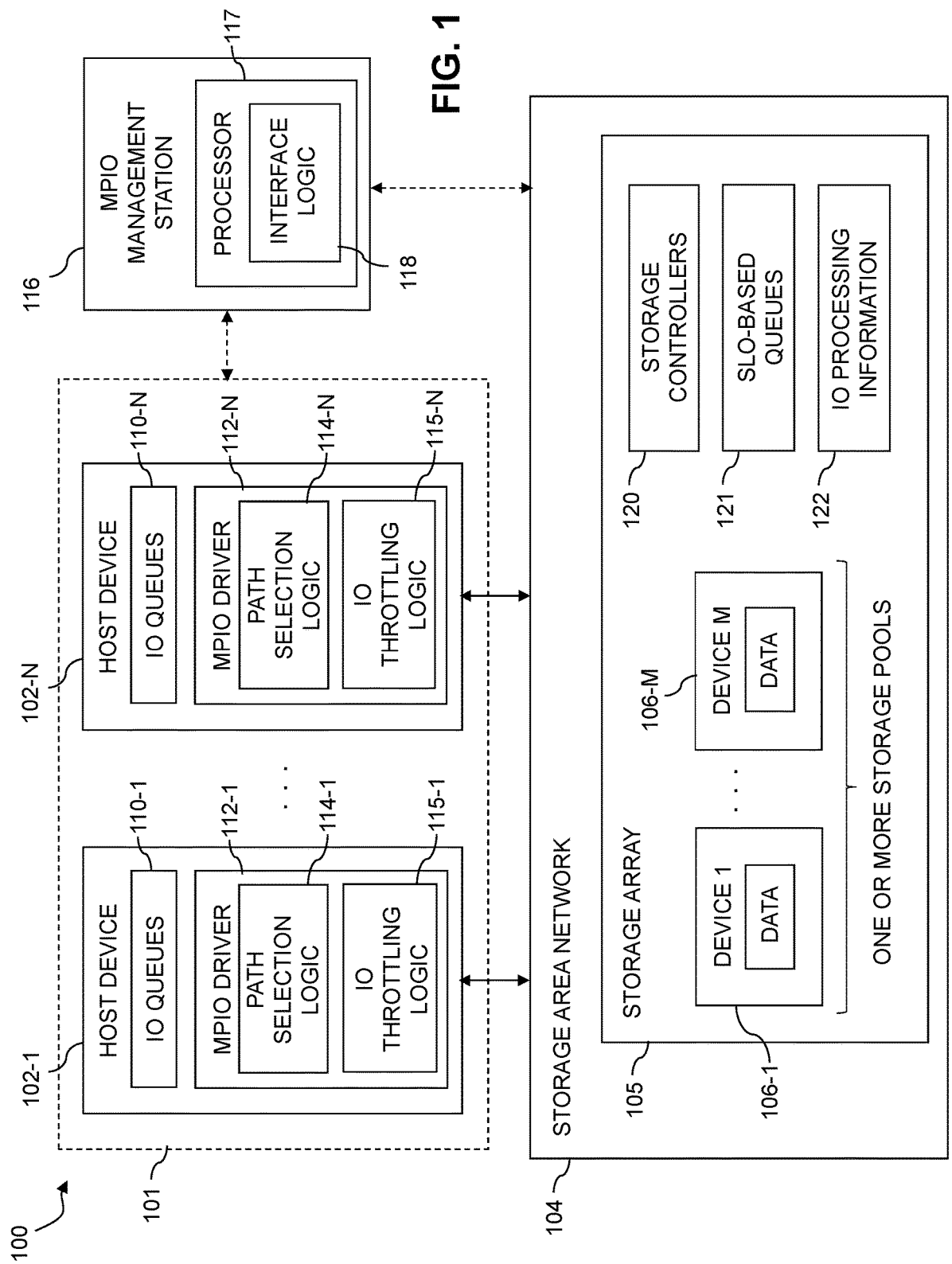
FIG. 1 is a block diagram of an information processing system configured with functionality for host-assisted IO service levels in an illustrative embodiment.

FIG. 1 shows an information processing system 100 configured in accordance with an illustrative embodiment. The information processing system 100 comprises a computer system 101 that includes a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Non-Volatile Memory Express (NVMe) commands, although other types of commands can be used in other embodiments. A given TO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of TO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for host-assisted IO service levels. Such functionality is provided at least in part using respective instances of IO throttling logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for host-assisted IO service levels. Other types of MPIO drivers from other driver vendors may be suitably modified to incorporate functionality for host-assisted IO service levels as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical storage volumes or other logical storage devices of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective NVMe commands, although other command formats can be used in other embodiments. For example, Small Computer System Interface (SCSI) commands can be used in some embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath ° drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, one or more sets of SLO-based queues 121, and one or more instances of IO processing information 122.

The storage controllers 120 illustratively control the processing of IO operations received in the storage array 105 from the host devices 102. For example, the storage controllers 120 illustratively manage the processing of read and write commands directed by the MPIO drivers 112 to particular ones of the storage devices 106.

The SLO-based queues 121 illustratively comprise respective IO operation priority queues, and may be implemented as respective portions of a persistent memory of the storage array 105. The storage controllers 120 in some embodiments implement one or more response time control modules that are used to implement storage array based adjustments in response time for particular operations based at least in part on SLO information stored by the storage array 105 in its persistent memory. The response time control module is assumed to operate in conjunction with the SLO-based queues 121.

The storage array 105 illustratively utilizes its SLO-based queues 121 to provide different levels of performance for different IO operations. For example, the SLO-based queues 121 illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues 121. The SLO-based queues 121 are illustratively associated with respective SLOs for processing of IO operations in the storage array 105. Process tags may be used in assigning different ones of the IO operations to different ones of the SLO-based queues 121, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the SLO-based queues 121.

Figure 4:
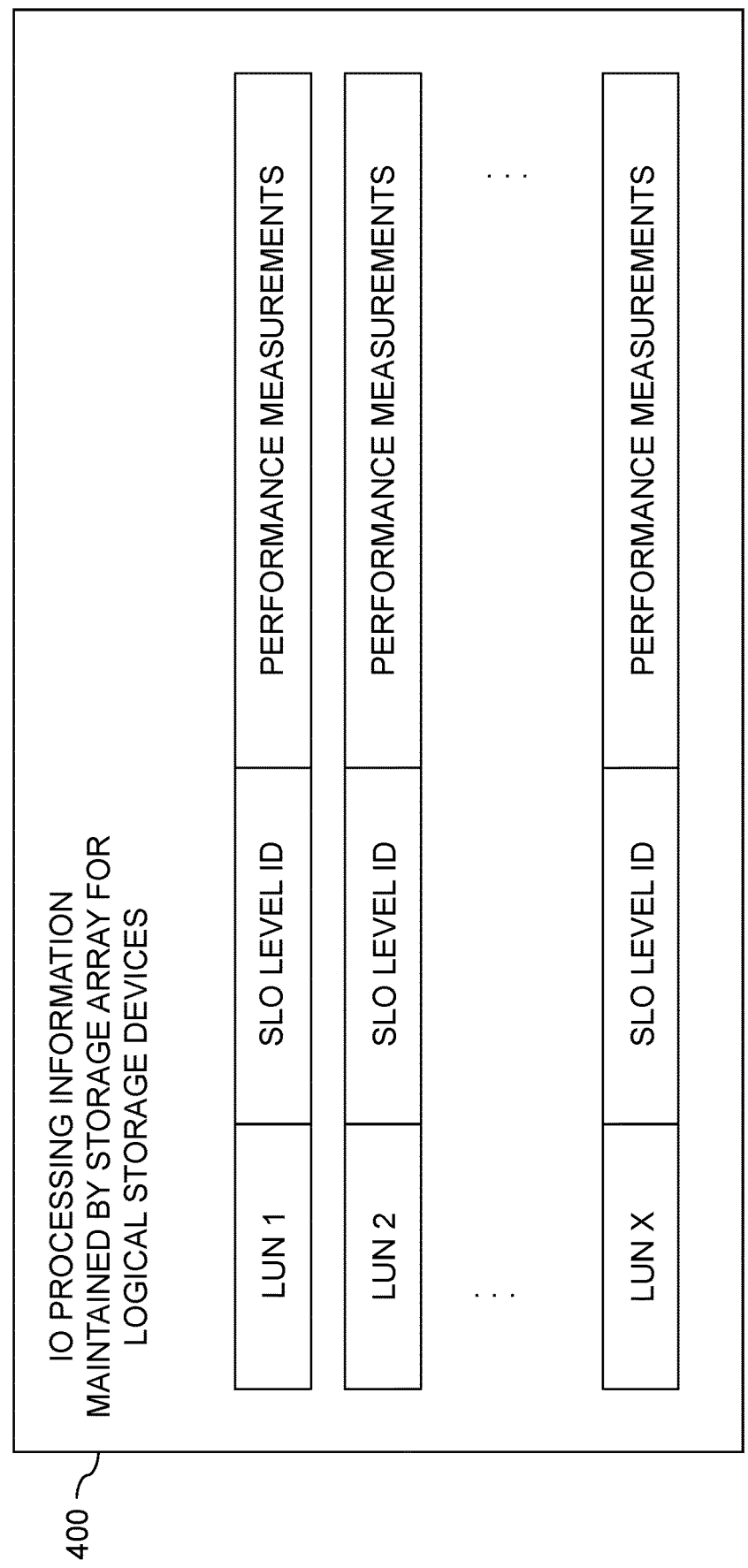
FIG. 4 shows an example of IO processing information maintained by a storage system for use in implementing host-assisted IO service levels in an illustrative embodiment.

The IO processing information 122 is illustratively maintained by the storage array 105 for respective LUNs or other logical storage devices, and can be arranged, for example, in the manner illustrated in the example of FIG. 4, or utilizing other types and arrangements of tables or other data structures.

It is assumed that the MPIO drivers 112 of the respective host devices 102 can read or otherwise obtain at least portions of the IO processing information 122 directly or indirectly from the storage array 105.

For example, at least portions of the IO processing information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log page command, a log sense command, a mode sense command, a "vendor unique command" or VU command, or combinations of multiple instances of these or other commands, in an otherwise standardized command format, such as an NVMe format, a SCSI format or other type of format.

Additionally or alternatively, at least portions of the IO processing information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The storage array 105 via its storage controllers 120, SLO-based queues 121 and IO processing information 122 is illustratively configured to identify at least one logical storage device that has a first SLO and is exhibiting a deficiency in one or more performance metrics, and to identify one or more additional logical storage devices each having a second SLO lower than the first SLO and not exhibiting a deficiency in the one or more performance metrics. The storage array 105 via its storage controllers 120, SLO-based queues 121 and IO processing information 122 is further configured to generate at least one false-positive signal specifying the one or more additional logical storage devices as each exhibiting a deficiency in the one or more performance metrics, and to provide the at least one false-positive signal to at least one of the host devices 102, illustratively the host device 102-1.

The false-positive signal in some embodiments may be viewed as part of the IO processing information 122 that is maintained by the storage array 105 for respective different logical storage devices.

It should be noted the term "lower than" in the context of different SLOs is intended to be broadly construed. For example, a Bronze SLO is considered lower than a Diamond SLO, even though the SLOs may be characterized by a response time performance metric in which a lower response time indicates a higher level of service and vice versa. Accordingly, the respective levels of the SLOs may be viewed as being arranged in a hierarchy of levels that increase from a relatively low level of service to a relatively high level of service.

The host device 102-1 is configured to respond to the at least one false-positive signal by throttling IO operations for the one or more additional logical storage devices, illustratively utilizing its IO queues 110-1 and MPIO driver 112-1. For example, host device 102-1 is illustratively configured to respond to the at least one false-positive signal by increasing a queuing time in one or more of the IO queues 110-1 for each of one or more IO operations directed to the one or more additional logical storage devices.

In implementing its IO throttling functionality, the host device 102-1 is illustratively configured to differentiate between a normal warning and a false-positive warning associated with the received false-positive signal. This ability to differentiate between different types of warnings can be incorporated into the IO throttling logic 115-1.

In some embodiments, the at least one false-positive signal is provided by the storage array 105 to at least one of the MPIO drivers 112 of the host devices 102. For example, the MPIO driver 112-1 is illustratively configured, responsive to a false-positive signal received from the storage array 105, to at least temporarily reduce a rate at which IO operations are sent by the host device 102-1 to the one or more additional logical storage devices.

Such functions are illustratively performed by the MPIO driver 112-1 of the host device 102-1, utilizing its IO throttling logic 115-1 in cooperation with its path selection logic 114-1, although other arrangements are possible. For example, these and other functions referred to herein as being performed by an MPIO driver can in other embodiments be performed at least in part by other host device components.

Other MPIO drivers 112 on other host devices 102 are configured in a similar manner to provide host-assisted IO service levels responsive to false-positive signals received from the storage array 105.

In some embodiments, the first SLO illustratively comprises a highest one of a plurality of SLOs supported by the storage array 105, and the second SLO illustratively comprises a lowest one of a plurality of SLOs supported by the storage array 105. With reference to the previous example in which there are four different SLOs denoted Diamond, Gold, Silver and Bronze, the first SLO could be the Diamond SLO and the second SLO could be the Bronze SLO. It is to be appreciated that these and other particular SLOs referred to herein are only examples, and numerous other types and arrangements of SLOs can be used in other embodiments, with a wide variety of different naming conventions. As indicated previously, such SLOs are also referred to herein as service levels or SLO levels.

The performance metric in some embodiments comprises a response time metric for IO operations directed to at least one of the logical storage devices by the host devices 102, although additional or alternative performance metrics can be used.

In some embodiments, the host devices 102 and the storage array 105 communicate over the SAN 104 utilizing a designated storage access protocol that supports a predictable latency mode (PLM). For example, the designated storage access protocol illustratively comprises an NVMe access protocol that supports a PLM.

The above-noted at least one false-positive signal is illustratively generated in accordance with a signaling mechanism of the PLM of the designated storage access protocol. For example, the at least one false-positive signal in some embodiments comprises at least one predictable latency warning event of the PLM.

More particularly, in some embodiments, the at least one false-positive signal comprises at least one of a deterministic window reads warning event and a deterministic window writes warning event of the PLM.

The at least one false-positive signal is illustratively generated by the storage array 105 even though values of the performance metric for respective ones of the one or more additional logical storage devices each fail to satisfy at least one specified threshold for generation of a predictable latency warning event in the PLM. In other words, absent use of the techniques disclosed herein, such a predictable latency warning event would not be generated for the one or more logical storage devices, in accordance with the normal operation of the PLM of the storage access protocol. Illustrative embodiments herein generate the at least one false-positive signal in the PLM in order to cause one or more of the host devices 102 to alter their queuing behavior for the one or more additional logical storage devices. This facilitates achievement of the SLOs by the storage array 105 in a manner that advantageously avoids excessive queuing of IO operations in the storage array 105.

In some embodiments, providing the at least one false-positive signal to the host device 102-1 more particularly comprises providing the at least one false-positive signal in at least one log page accessible to the host device 102-1. For example, the storage array 105 can insert the false-positive signal into the log page, such as an NVMe set log page, and the false-positive signal is then sent to the host device 102-1 responsive to a read log page command directed to that log page by the host device 102-1.

The above-noted command in some embodiments comprises at least one predetermined command of a storage access protocol which the host device 102-1 utilizes to communicate with the storage array 105, such as an NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of logical storage devices. Separate commands are utilized in some embodiments to obtain IO processing information from the storage array 105 for respective logical storage devices. In other embodiments, a single command can be sent by the host device 102-1 to the storage array 105 to obtain IO processing information for multiple logical storage devices. These and other references herein to sending a command from a host device to a storage array, to obtain false-positive signals or other types of IO processing information from the storage array for one or more logical storage devices, are intended to be broadly construed.

The at least one false-positive signal provided by the storage array 105 in some embodiments serves to mark each of the one or more additional logical storage devices for de-prioritization by the host device 102-1.

In some embodiments, the at least one false-positive signal is generated by the storage array 105 for only reads of the one or more additional logical storage devices or for only writes of the one or more additional logical storage devices. Such an arrangement allows the storage array 105 to de-prioritize reads relative to writes or vice versa.

A detected performance metric deficiency in some embodiments may comprise, for example, a detected write pressure condition and/or a detected read pressure condition relating to one or more logical storage devices. As a more particular example, the storage array 105 can be configured to monitor write pressure related performance metrics such as at least one of a write count, a write pending count and a bandwidth consumption for each of a plurality of logical storage devices, and to detect the deficiency as an above-threshold amount of increase in at least one of the write count, the write pending count and the bandwidth consumption for at least one of the logical storage devices. As indicated previously, additional or alternative performance metrics can be monitored in other embodiments and utilized to trigger false-positive signals as disclosed herein.

Figure 2:
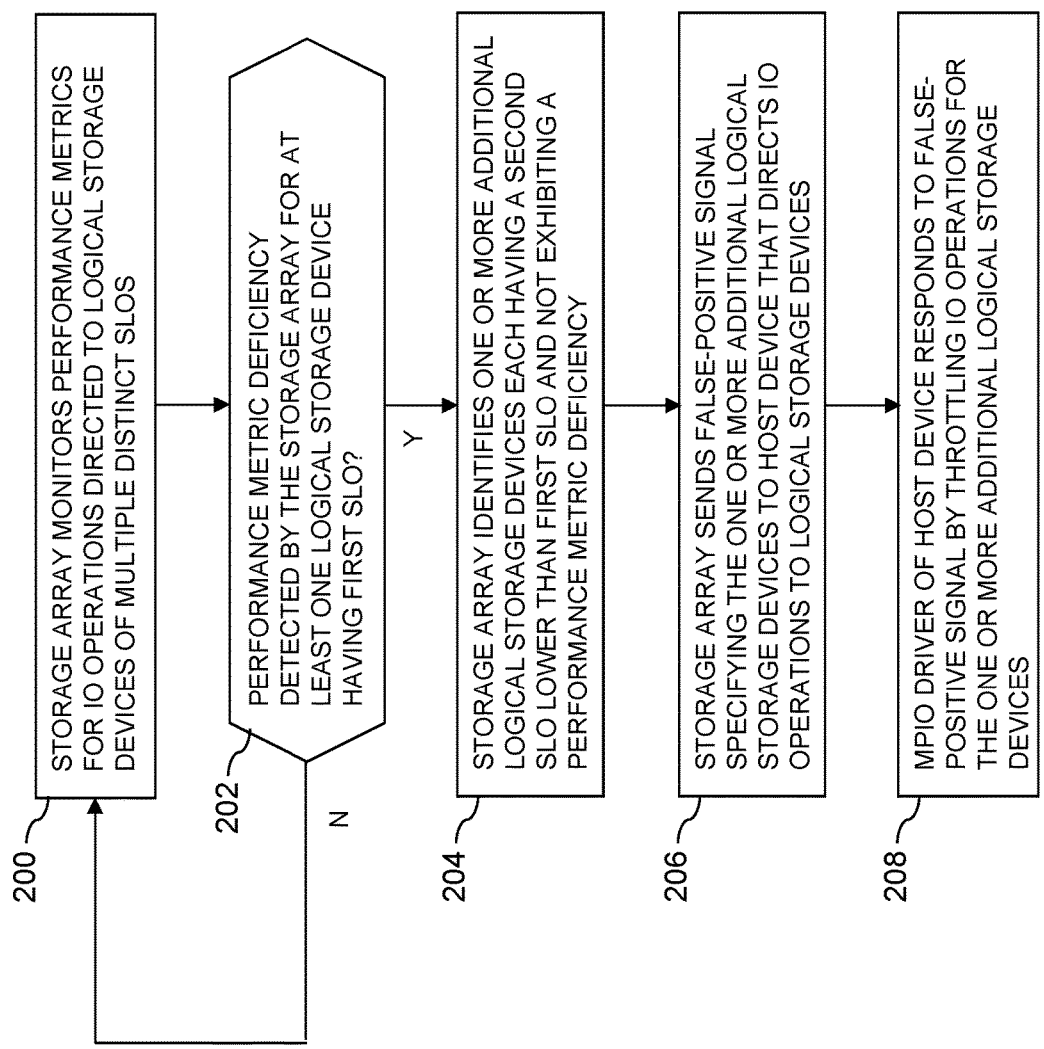
FIG. 2 is a flow diagram of a process for host-assisted IO service levels in an illustrative embodiment.

An example of an illustrative process including the above-described host-assisted IO service level functionality utilizing false-positive signaling is illustrated in the flow diagram of FIG. 2.

An example of a set of IO processing information 122 maintained by the storage array 105 for respective LUNs or other logical storage devices is illustrated in FIG. 4. It is assumed that the storage array 105 maintains similar IO processing information for each of at least a subset of the logical storage devices of the storage array 105. Such IO processing information can comprise one or more false-positive signals for respective ones of the one or more additional logical storage devices.

As noted above, in some embodiments, a false-positive signal is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that a false-positive signal can be obtained by the host device 102-1 indirectly from the storage array 105 utilizing an out-of-band communication mechanism via at least one intermediary device. An intermediary device in such an embodiment illustratively comprises the MPIO management station 116 of system 100. The MPIO management station 116 can comprise a server configured to obtain the false-positive signal directly from the storage array 105. The MPIO management station 116 is illustratively connected directly to the storage array 105, and can communicate with the storage array 105 utilizing standard storage access protocols such as NVMe.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain false-positive signals or other types of IO processing information to facilitate host-assisted IO service levels for one or more logical storage devices as disclosed herein.

As indicated previously, conventional approaches to IO throttling are problematic, in that a storage array or other storage system may rely excessively on queuing of IO operations within the storage array. Excessive queuing of IO operations in a storage array can not only lead to potentially misleading response time measurements for those IO operations, but can also cause the storage system to frequently signal queue-full conditions back to the host devices, with associated negative performance impacts.

For example, many applications today run in-memory, and destage the cached changes in batches which produce write bursts. To handle such write bursts under conventional practice, the storage array would need to be sized for bandwidth and central processing unit (CPU) resources that may be far beyond those required in steady state operation. Often such write bursts overload the storage array and thus the writes are cached and held in the storage array until the storage array has sufficient bandwidth and CPU resources available to process them. Similar issues can arise with other types of IO operations, such as reads.

A given storage array typically handles IO operations from many hosts, which means that the internal resources of the storage array are divided between the hosts. When one host creates an IO burst, many storage array resources are diverted to handle this host, and thus one or more other hosts may be adversely impacted. For example, a host may fill the storage array front end IO queue with IOs. The storage array may either dedicate too many queue entries for that host, thus starving one or more other hosts, or report a queue-full condition which adversely impacts the overall performance of the host. The queue-full condition is common to both read pressure and write pressure, and provides the host with very limited information. Also, such queue-full conditions are high impact conditions, and performance suffers if queue-full conditions are reported too frequently.

Each of the hosts usually has a queue capacity that is far larger than the queue capacity that the storage array has for that host. Therefore, it would generally be better for the host to avoid sending more commands to the storage array than sending those commands and having the storage array queue the commands.

For example, in some embodiments herein, each of the host devices 102 has a corresponding set of IO queues 110 for storing IO operations to be delivered to the storage array 105, where a total capacity of the IO queues of the host device is greater than that of an allocated portion of a total IO queue capacity of the storage array 105 that is allocated by the storage array 105 to the host device.

As described previously, the storage array 105 in some embodiments implements different types of processing for different SLOs to differentiate between the various service levels that customers require. For example, service levels in a given embodiment may be defined as Diamond, Gold, Silver, Bronze, etc., although as noted above numerous other types and arrangements of SLOs can be used in other embodiments.

Such SLOs are illustratively assigned on a per-device basis, where the devices comprise respective logical storage volumes or other types of logical storage devices, although other arrangements are possible. A LUN or logical unit as that term is used herein is an example of a type of logical storage device, also referred to herein as simply a "device."

The storage array 105 implements such SLOs using various methods such as data placement on storage drives of different types, possibly in different storage tiers, and/or using selective IO handling on its front end.

Conventional approaches involving storage array implementation of SLOs generally do not distinguish between different types of IO operations, such as read and write operations. Moreover, these conventional approaches typically involve delaying execution in the storage array of IOs for devices with lower SLOs, if devices with higher SLOs are not meeting their respective response time goals, by queuing the IOs for the devices with lower SLOs in the storage array. In a more particular example of an approach of this type, if the storage array detects that response times for IOs with an assigned SLO of Diamond are too high, the storage array illustratively addresses such a condition by delaying the starting of execution for IOs for devices with an assigned SLO of Bronze.

Such queueing in the storage array increases the measured response time for the queued IOs, inadvertently creating the perception that execution of those IOs in the storage array took much longer than it actually did, as most of the response time was time spent by the IOs waiting in storage array queues. The queueing in the storage array also may have an adverse impact on overall performance, as queue management can consume significant CPU resources, particularly as queue lengths increase.

Illustrative embodiments overcome these and other drawbacks of conventional practice by configuring the storage array 105 to provide false-positive signaling back to the host devices 102 so as to cause the host devices to modify their queuing behavior in a manner that facilitates the achievement of SLOs in the storage array, while also providing more accurate response time measures and substantially reduced reporting of queue-full conditions by the storage array 105. This is an example of what is referred to herein as host-assisted IO service levels utilizing false-positive signaling.

As indicated previously, some embodiments herein are configured to utilize the PLM of the NVMe access protocol. The NVMe access protocol includes a PLM configuration command, and this command includes a predictable latency enable bit. When the predictable latency bit is set in accordance with the NVMe access protocol, then PLM is enabled for the NVMe set specified by the command, where the NVMe set illustratively comprises a device list identifying one or more logical storage volumes or other types of logical storage devices, also referred to as respective namespaces in the NVMe context.

In the PLM of the NVMe access protocol, separate thresholds for reads and writes are illustratively used, and are also referred to as deterministic window ("DTWin") reads threshold and DTWin writes threshold.

If the value of a DTWin reads estimate falls below the DTWin reads threshold, a DTWin reads warning event is enabled, illustratively by setting the DTWin reads warning event in a predictable latency per NVMe set log page for the affected NVMe set.

Similarly, if the value of a DTWin writes estimate falls below the DTWin writes threshold, a DTWin writes warning event is enabled, illustratively by setting the DTWin writes warning event in a predictable latency per NVMe set log page for the affected NVMe set.

Although in some embodiments certain commands used by the host devices 102 to communicate with the storage array 105 illustratively comprise NVMe commands, it is to be appreciated that other types of commands and command formats can be used in other embodiments.

Additional details regarding NVMe commands and other related storage access protocol functionality utilized in illustrative embodiments herein, including the NVMe PLM configurations that are used to convey false-positive signals between the storage array 105 and the host devices 102 in some embodiments, are described in the NVMe Base Specification, Revision 2.0b, Jan. 6, 2022, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

Illustrative embodiments herein leverage the above-described PLM of the NVMe access protocol to allow the storage array 105 to signal to a given one of the host devices 102, illustratively the host device 102-1, that a certain logical storage volume or other logical storage device is an "offending volume" even if that particular logical storage device has not actually offended or otherwise violated its assigned response time goal. Instead, an "offending volume" in one or more embodiments is illustratively a volume with a lower SLO that needs to be slowed down by the host device 102-1 to allow one or more other volumes with higher SLOs to achieve their respective response time goals.

In other words, illustrative embodiments allow the storage array 105 to "mark" a given volume as a volume that the host device 102-1 should treat as lower priority than one or more other volumes, utilizing false-positive signaling as disclosed herein. The host device 102-1 responds to such a marking by de-prioritizing the corresponding volume, illustratively by queuing its IO operations in the IO queues 110-1 of host device 102-1 so as to provide higher priority to the one or more other volumes. Such an arrangement may be viewed as an example of one in which the storage array 105 marks particular volumes for which IO operations are to be throttled by the host device 102-1.

An algorithm performed by the storage array 105 and the MPIO driver 112-1 of host device 102-1, utilizing IO queues 110-1, path selection logic 114-1 and IO throttling logic 115-1, illustratively includes the following steps, although additional or alternative steps can be used in other embodiments:

1. The MPIO driver 112-1 of the host device 102-1 sends IOs that target data of logical storage volumes of the storage array 105.

2. The storage array 105 detects a condition in which one or more logical storage volumes with relatively high SLOs are not meeting their respective response time goals. This is an example of what is more generally referred to herein as a "performance metric deficiency" of the one or more logical storage volumes. Additional or alternative performance metrics other than response time can be used in other embodiments.

3. The storage array 105 identifies one or more "offending volumes" having relatively low SLOs. These "offending volumes" are not actually offending or otherwise violating their response time goals, but will be used by the storage array 105 to trigger the host device 102-1 to modify its queueing behavior.

4. For the one or more identified "offending volumes," the storage array 105 utilizes the NVMe PLM signaling mechanism to send a false-positive warning to the host device 102-1 for those logical storage volumes. The false-positive warning is illustratively a predictable latency warning event of the type described previously, such as a DTWin reads warning event and/or a DTWin writes warning event. It is a false-positive warning in that the one or more identified "offending volumes" would not otherwise meet the requirements for generation of the corresponding predictable latency warning event under the NVMe access protocol. Other types of false-positive signaling can be used in other embodiments, and terms such as "false-positive signal" as used herein are therefore intended to be broadly construed.

The MPIO driver 112-1 in the host device 102-1 responds to the false-positive warning from the storage array 105 by increasing the queuing of IOs of the one or more "offending volumes" in the IO queues 110-1 of the host device 102-1. This advantageously allows the one or more logical storage volumes with relatively high SLOs to meet their respective response time goals, while also avoiding the need to queue the IOs of the one or more "offending volumes" in the storage array 105. In other words, the host device 102-1 de-prioritizes IOs of "offending volumes" by prioritizing the sending IOs of "non-offending volumes" over the sending of IOs of "offending volumes." This is illustratively achieved through increased queueing of the IOs of the "offending volumes," or in other words, holding those IOs in the IO queues 110-1 of the host device 102-1 for longer than they would otherwise have been held. This is an example of "throttling" of the IOs of the one or more "offending volumes," in accordance with functionality for host-assisted IO service levels as disclosed herein.

Such an arrangement can reduce the measured response times of the IOs of the one or more "offending volumes" that are now queued in the host device 102-1 instead of in the storage array 105, since the response of a given IO operation is typically measured from the sending of that IO operation from the host device 102-1 to the storage array 105. It also simplifies queue management in the storage array 105, leading to reduced consumption of storage array CPU resources for queue management.

These and other embodiments can also be used to prioritize reads over writes or vice versa. For example, an administrator or other user may indicate to the storage array 105 that for a certain set of one or more logical storage volumes, read commands have higher priority than write commands or vice versa. The storage array 105 can then generate the above-noted false-positive warning for a certain command type, such as reads or writes. For example, the storage array 105 can prioritize reads over writes by generating a false-positive warning for writes, causing the host device 102-1 to de-prioritize writes while prioritizing reads. This illustratively involves throttling writes through increased queuing of writes.

Illustrative embodiments provide significant advantages over conventional practice. For example, the example algorithm described above provides an efficient mechanism for host-assisted IO service levels that leverages SLO information in a storage array through utilization of false-positive signaling, illustratively within the signaling mechanisms of the PLM of the NVMe access protocol.

These and other embodiments avoid IO processing pressure that can arise in cases of database memory flush, and in a wide variety of other contexts. As a result, IO processing performance is improved, and the system can more easily meet the performance goals of the different levels of SLOs.

In addition, some embodiments avoid the negative host performance implications of excessive signaling of queue-full conditions in a storage array.

Moreover, the potentially negative perceptions of excessive response times for IOs waiting in storage array queues is advantageously avoided in illustrative embodiments.

Furthermore, one or more of the disclosed embodiments can simplify queue management in the storage array, leading to reduced consumption of storage array CPU resources for queue management.

Although particular signaling mechanisms of the NVMe storage access protocol are used in illustrative embodiments herein, other arrangements can be used in other embodiments. For example, different storage access protocols can be used, and the disclosed embodiments should therefore not be viewed as being limited to NVMe.

The above-described algorithm in some embodiments is implemented by cooperative interaction of storage controllers 120 of storage array 105 and instances of IO throttling logic 115 in MPIO drivers 112 of host devices 102.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed host-assisted IO service levels functionality is carried out using one or more non-MPIO host drivers.

Additional examples of host-assisted IO service level arrangements will be described elsewhere herein in conjunction with the embodiments of FIGS. 2 through 4. Other types of host-assisted IO service level arrangements can be used in other embodiments.

These and other functions related to host-assisted IO service levels that are referred to herein as being performed by or under the control of the MPIO driver 112-1 can in some embodiments be performed at least in part outside of the MPIO driver 112-1, such as in the host device 102-1 generally.

The above-described functions associated with host-assisted IO service levels in the MPIO driver 112-1 in some embodiments are carried out at least in part under the control of its IO throttling logic 115-1, illustratively operating in cooperation with path selection logic 114-1. For example, the IO throttling logic 115-1 is illustratively configured to control performance of the IO throttling functionality in the example algorithm above and the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform portions of the disclosed functionality for host-assisted IO service levels.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality. Such conventional MPIO functionality is suitably modified in illustrative embodiments disclosed herein to support host-assisted IO service levels.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements and/or Asymmetric Namespace Access (ANA) arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and IO throttling logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 2 process are illustratively performed at least in part by or under the control of a storage array, operating in conjunction with an MPIO driver of a given host device. For example, portions of the process may be carried out under the control of software, firmware and/or hardware of an instance of IO throttling logic deployed within the MPIO driver. Accordingly, the FIG. 2 process may be viewed as an example of an algorithm performed in part by the IO throttling logic 115-1 of the MPIO driver 112-1 of host device 102-1, through interaction with storage array 105. Other arrangements of storage array components, host device components and/or other system components can be configured to perform at least portions of one or more of the steps in other embodiments.

In step 200, the storage array monitors performance metrics for IO operations directed to logical storage devices of multiple distinct SLOs. Such SLOs are also referred to herein as service levels or SLO levels. As noted above, example SLO levels include Diamond, Gold, Silver and Bronze, illustratively ordered from high to low in terms of response time objective or other type of SLO, although a wide variety of other types of SLO levels and associated performance metrics are possible. The monitored performance metrics can include, for example, response times for respective ones of the IO operations, as well as additional or alternative performance metrics indicative of IO processing performance.

In step 202, a determination is made as to whether or not a performance metric deficiency is detected by the storage array for at least one logical storage device having a first SLO, illustratively corresponding to a relatively high SLO level. For example, a performance metric deficiency can be indicated by an average response time or other performance metric exceeding a specified threshold previously established for that performance metric. If such a performance metric deficiency is not detected, the process returns to step 200 to continue monitoring performance for IO operations directed to logical storage devices of multiple distinct SLOs, and otherwise moves to step 204 as shown.

In step 204, which is reached if a performance metric deficiency is detected for at least one logical storage device a first set of logical storage devices having the first SLO, the storage array identifies one or more additional logical storage devices each having a second SLO that is lower than the first SLO and not exhibiting a performance metric deficiency. The second SLO illustratively corresponds to a relatively low SLO level, as compared to the relatively low SLO level of the first SLO.

In step 206, the storage array sends at least one false-positive signal, specifying the one or more additional logical storage devices, to a host device that directs IO operations to the logical storage devices.

In step 208, the MPIO driver of the host device responds to the false-positive signal by throttling IO operations for the one or more additional logical storage devices. Such throttling by the MPIO driver of the host device illustratively continues until the performance metric deficiency of the at least one logical storage device having the first SLO is sufficiently alleviated, as indicated by further signaling received from the storage array. For example, the MPIO driver can reduce the rate at which IO operations are sent to the one or more additional logical storage devices for one or more throttle-down periods until such time that the storage array sends further signaling which modifies the previous signaling.

Multiple additional instances of the FIG. 2 process may be performed for respective additional host devices that share the storage array. Other embodiments can include multiple storage arrays, with the disclosed functionality for host-assisted IO service levels being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for host-assisted IO service levels. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different host-assisted IO service level arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
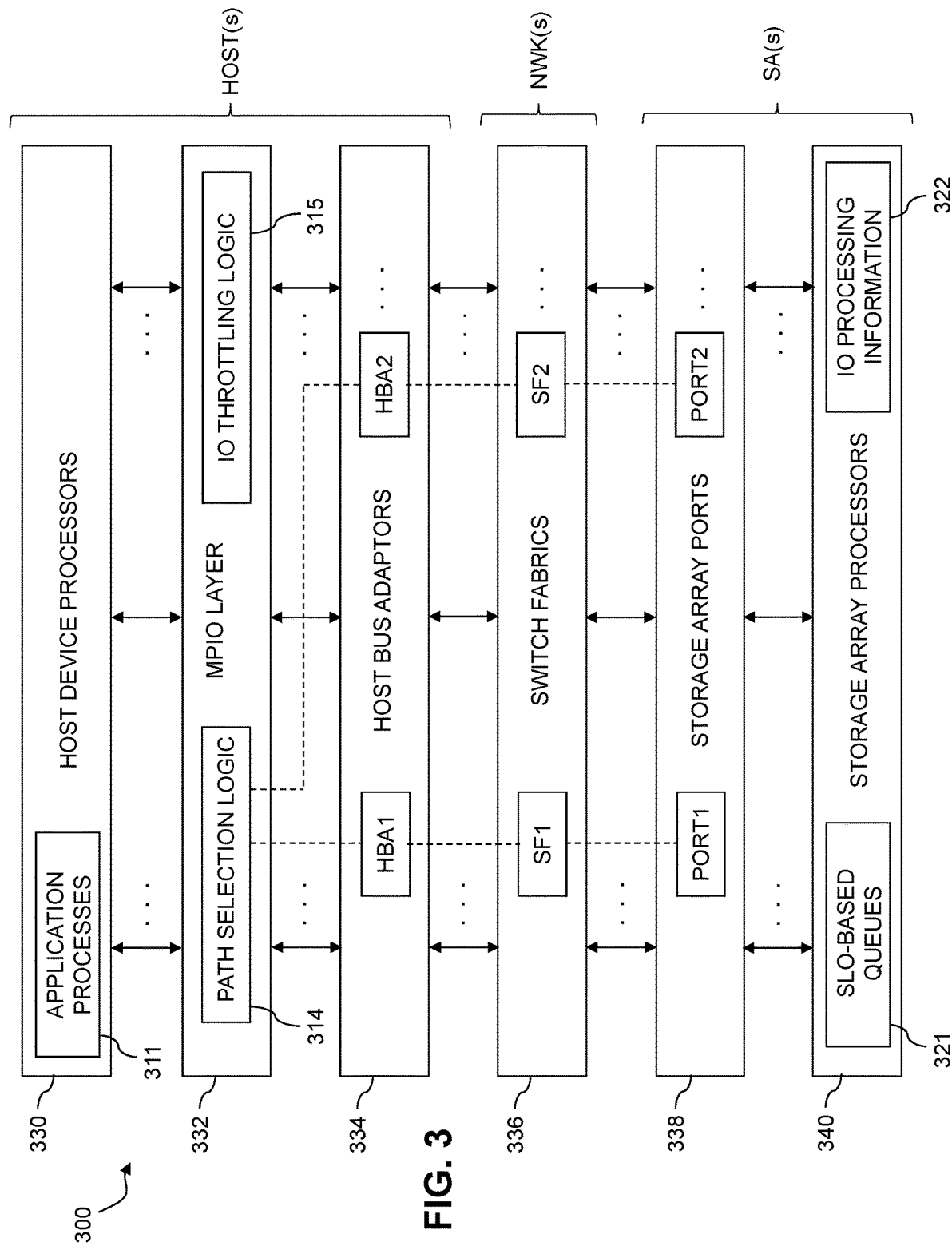
FIG. 3 is a block diagram showing multiple layers of a layered system architecture that includes functionality for host-assisted IO service levels in an illustrative embodiment.

Referring now to FIG. 3, another illustrative embodiment is shown. In this embodiment, an information processing system 300 comprises host-side elements that include application processes 311, path selection logic 314 and IO throttling logic 315, and storage-side elements that include SLO-based queues 321 and IO processing information 322. There may be separate instances of one or more such elements associated with each of a plurality of system components such as host devices and storage arrays of the system 300. In a manner similar to that described elsewhere herein, the IO processing information 322 is determined based at least in part on performance measurements for IO operations associated with the SLO-based queues 321 in one or more storage arrays, and is obtainable by one or more host devices via their respective MPIO drivers and utilized by the IO throttling logic 315 to control rates at which IO operations are sent to particular logical storage devices of the one or more storage arrays over paths selected by the path selection logic 314.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements host-assisted IO service levels utilizing one or more MPIO drivers of the MPIO layer 332, and associated instances of IO throttling logic 315. The application processes 311 generate IO operations that are processed by the MPIO layer 332 for delivery to the one or more storage arrays. Paths are determined by the path selection logic 314 for sending such IO operations to the one or more storage arrays. These IO operations include IO operations that are illustratively subject to IO throttling in IO throttling logic 315 based at least in part on IO processing information obtained by the MPIO driver for respective logical storage devices via false-positive signaling, possibly in the PLM of the NVMe access protocol. The IO throttling logic 315 operates in cooperation with the path selection logic 314 in one or more MPIO drivers of the MPIO layer 332 to implement host-assisted IO service levels in the manner disclosed herein.

The MPIO layer 332 is an example of what is also referred to herein as a multi-path layer, and comprises one or more MPIO drivers implemented in respective host devices. Each such MPIO driver illustratively comprises respective instances of path selection logic 314 and IO throttling logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of IO throttling logic 315 provide functionality for host-assisted service levels, illustratively with involvement of other host device components such as the path selection logic 314. This involves throttling of IO operations directed to particular logical storage devices responsive to false-positive signaling from a storage array.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example of a set of IO processing information 400 maintained by a storage system such as storage array 105 is shown. The disclosed arrangements can be similarly utilized in system 300 of FIG. 3.

The IO processing information 400, utilized in some embodiments to support false-positive signaling by the storage array 105 to one or more host devices 102, can include write pressure information, read pressure information, or combinations of write and read pressure information, as well as additional or alternative information. The IO processing information 400 is illustratively maintained by the storage array 105 for particular LUNs that are denoted LUN 1, LUN 2, . . . LUN X in the figure. These LUNs may comprise all of the LUNs of the storage array 105, or a designated subset of the LUNs of the storage array 105. Different sets of IO processing information similar to IO processing information 400 may be maintained for respective different sets of LUNs of the storage array 105. The IO processing information 400 may be viewed as one possible example of IO processing information 122 of storage array 105 in the FIG. 1 embodiment. Similar IO processing information may be utilized as IO processing information 322 in the FIG. 3 embodiment.

The IO processing information 400 more particularly includes performance measurements for each of the LUNs denoted LUN 1 through LUN X, as well as a corresponding SLO level identifier (ID) as indicated. The performance measurements in some embodiments comprise response time measurements compiled by the storage array 105 over a designated time period for IO operations directed to the corresponding LUNs. Additional or alternative performance metrics that can be used in generating the performance measurements include, for example, at least one of a write count, a write pending count and a bandwidth consumption for IO operations directed to the corresponding LUNs.

The IO processing information 400 is utilized in conjunction with SLO-based queues 121 of the storage array 105 in detecting performance metric deficiencies and implementing associated host-assisted IO service levels as disclosed herein.

The particular IO processing information arrangement shown in FIG. 4 is only an example, and numerous other types and arrangements of IO processing information can be maintained by a storage system in other embodiments. Terms such as "IO processing information" as used herein are intended to be broadly construed.

As indicated above, the MPIO driver of a given one of the host devices 102 can obtain IO processing information from the storage array 105 by sending commands to the storage array 105, in the manner previously described. For example, false-positive signals of the type disclosed herein can be obtained by the MPIO driver 112-1 of the host device 102-1 sending one or more NVMe commands to access an NVMe set log page in accordance with the NVMe PLM as described elsewhere herein.

The IO processing information 400 is illustratively stored in a storage array memory accessible to a multi-path layer of the host device 102-1. Other types of data structures can be used in other embodiments.

On the host side, at least portions of such IO processing information obtained from the storage array 105 and characterizing one or more logical storage devices are illustratively stored in a data structure of a kernel-space portion of the MPIO driver 112-1, although other storage arrangements with other types of data structures can be used.

In some embodiments, an MPIO driver obtains IO processing information directly from a storage array, through interaction with the storage array as described elsewhere herein. For example, MPIO driver 112-1 is illustratively configured to obtain the IO processing information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the IO processing information other than through direct communication with the storage array. Such arrangements illustratively involve obtaining the IO processing information indirectly from the storage array utilizing an out-of-band communication mechanism via at least one intermediary device, such as the MPIO management station 116, which may comprise one or more servers.

The above-described processes, algorithms and other features and functionality disclosed herein are presented by way of illustrative example only, and other embodiments can utilize additional or alternative arrangements.

Also, as mentioned previously, different instances of the above-described processes, algorithms and other host-assisted IO service levels techniques can be performed by different MPIO drivers in different host devices, or using other types of host drivers, such as, for example, iSCSI drivers.

The particular host-assisted IO service level arrangements described above are therefore presented by way of illustrative example only. Numerous alternative arrangements of these and other features can be used in implementing the host-assisted IO service levels in other illustrative embodiments.

As indicated previously, illustrative embodiments disclosed herein can provide a number of significant advantages relative to conventional arrangements.

For example, these embodiments provide efficient algorithms for implementing host-assisted IO service levels utilizing false-positive signaling that leverages SLO information in a storage array.

These and other embodiments avoid IO processing pressure that can arise in a storage array in cases of database memory flush, and in a wide variety of other contexts. As a result, IO processing performance is improved, and the system can more easily meet the performance goals of the different levels of SLOs.

Such embodiments advantageously avoid the complications of conventional approaches that rely excessively on transmission of queue-full indicators to host devices in the presence of IO processing pressure.

Illustrative embodiments can therefore prevent significant degradations in IO processing performance that might otherwise occur if excessive numbers of queue-full indicators were generated by a storage array or other storage system.

Moreover, the potentially negative perceptions of excessive response times for IOs waiting in storage array queues is advantageously avoided in illustrative embodiments.

Additionally or alternatively, some of the disclosed embodiments can simplify queue management in the storage array, leading to reduced consumption of storage array CPU resources for queue management.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a CPU, a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and IO throttling logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, IO throttling logic and additional or alternative components. Also, the particular configurations of system and device elements and associated processing operations illustratively shown in the drawings can be varied in other embodiments. For example, a wide variety of different host device and storage system configurations and associated host-assisted IO service level arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
where the at least one processing device is configured:
to identify at least one logical storage device that has a first service level objective and is exhibiting a deficiency in one or more performance metrics;
to identify one or more additional logical storage devices each having a second service level objective lower than the first service level objective and not exhibiting a deficiency in the one or more performance metrics;
to generate at least one false-positive signal specifying the one or more additional logical storage devices as each exhibiting a deficiency in the one or more performance metrics; and
to provide the at least one false-positive signal to at least one host device;
wherein the at least one host device is configured to respond to the at least one false-positive signal by throttling input-output operations for the one or more additional logical storage devices.

2. The apparatus of claim 1 wherein the at least one processing device is implemented in a storage system that is configured to communicate with the at least one host device over at least one network.

3. The apparatus of claim 2 wherein the first service level objective comprises a highest one of a plurality of service level objectives supported by the storage system.

4. The apparatus of claim 2 wherein the second service level objective comprises a lowest one of a plurality of service level objectives supported by the storage system.

5. The apparatus of claim 2 wherein the storage system communicates with the at least one host device over the at least one network utilizing a designated storage access protocol that supports a predictable latency mode.

6. The apparatus of claim 1 wherein the one or more performance metrics comprise at least a response time metric for input-output operations directed to at least one of the logical storage devices by the at least one host device.

7. The apparatus of claim 1 wherein the at least one false-positive signal is generated in accordance with a signaling mechanism of a predictable latency mode of a designated storage access protocol.

8. The apparatus of claim 7 wherein the at least one false-positive signal comprises at least one predictable latency warning event of the predictable latency mode.

9. The apparatus of claim 7 wherein the at least one false-positive signal comprises at least one of a deterministic window reads warning event and a deterministic window writes warning event of the predictable latency mode.

10. The apparatus of claim 7 wherein the at least one false-positive signal is generated even though values of the one or more performance metrics for respective ones of the one or more additional logical storage devices each fail to satisfy at least one specified threshold for generation of a predictable latency warning event in the predictable latency mode.

11. The apparatus of claim 1 wherein the at least one host device is configured to respond to the at least one false-positive signal by increasing a queuing time in one or more queues of the at least one host device for each of one or more input-output operations directed to the one or more additional logical storage devices.

12. The apparatus of claim 1 wherein the at least one false-positive signal is provided to the at least one host device in at least one log page accessible to the at least one host device.

13. The apparatus of claim 1 wherein the at least one false-positive signal serves to mark each of the one or more additional logical storage devices for de-prioritization by the at least one host device.

14. The apparatus of claim 1 wherein the at least one false-positive signal is generated for only reads of the one or more additional logical storage devices or for only writes of the one or more additional logical storage devices.

15. A computer program product comprising a non-transitory processor-readable storage medium having stored therein program code of one or more software programs, wherein the program code, when executed by at least one processing device comprising a processor coupled to a memory, causes the processing device:

to identify at least one logical storage device that has a first service level objective and is exhibiting a deficiency in one or more performance metrics;

to identify one or more additional logical storage devices each having a second service level objective lower than the first service level objective and not exhibiting a deficiency in the one or more performance metrics;

to generate at least one false-positive signal specifying the one or more additional logical storage devices as each exhibiting a deficiency in the one or more performance metrics; and to provide the at least one false-positive signal to at least one host device;

wherein the at least one host device is configured to respond to the at least one false-positive signal by throttling input-output operations for the one or more additional logical storage devices.

16. The computer program product of claim 15 wherein the at least one false-positive signal is generated in accordance with a signaling mechanism of a predictable latency mode of a designated storage access protocol.

17. The computer program product of claim 16 wherein the at least one false-positive signal comprises at least one of a deterministic window reads warning event and a deterministic window writes warning event of the predictable latency mode.

18. A method comprising:

identifying at least one logical storage device that has a first service level objective and is exhibiting a deficiency in one or more performance metrics;

identifying one or more additional logical storage devices each having a second service level objective lower than the first service level objective and not exhibiting a deficiency in the one or more performance metrics;

generating at least one false-positive signal specifying the one or more additional logical storage devices as each exhibiting a deficiency in the one or more performance metrics; and providing the at least one false-positive signal to at least one host device;

wherein the at least one host device is configured to respond to the at least one false-positive signal by throttling input-output operations for the one or more additional logical storage devices;

wherein the method is performed by at least one processing device comprising a processor coupled to a memory.

19. The method of claim 18 wherein the at least one false-positive signal is generated in accordance with a signaling mechanism of a predictable latency mode of a designated storage access protocol.

20. The method of claim 19 wherein the at least one false-positive signal comprises at least one of a deterministic window reads warning event and a deterministic window writes warning event of the predictable latency mode.

* * * * *